US006869201B2

(12) United States Patent
Kruger

(10) Patent No.: US 6,869,201 B2
(45) Date of Patent: Mar. 22, 2005

(54) REFLECTIVE FLASHLIGHT HOLDER

(75) Inventor: Stephen M. Kruger, 23502 Maple St., Newhall, CA (US) 91321

(73) Assignee: Stephen M. Kruger, Newhall, CA (US)

( * ) Notice: Subject to any disclaimer, the term of this patent is extended or adjusted under 35 U.S.C. 154(b) by 0 days.

(21) Appl. No.: 10/672,153

(22) Filed: Sep. 26, 2003

(65) Prior Publication Data

US 2004/0062906 A1 Apr. 1, 2004

Related U.S. Application Data

(60) Provisional application No. 60/413,744, filed on Sep. 27, 2002.

(51) Int. Cl.[7] .................................................. B32B 3/02

(52) U.S. Cl. ........................ 362/191; 362/287; 428/100; 428/99

(58) Field of Search ......................... 428/99, 100, 36.9; 362/191, 287

(56) References Cited

U.S. PATENT DOCUMENTS

| | | | | |
|---|---|---|---|---|
| 5,154,506 A | * | 10/1992 | Leard ......................... | 362/103 |
| D376,215 S | | 12/1996 | Gomm et al. | |
| 5,768,041 A | | 6/1998 | Rudolph | |
| D403,841 S | | 1/1999 | Drone | |
| 5,967,095 A | | 10/1999 | Greves | |
| 6,024,054 A | | 2/2000 | Matt et al. | |
| D423,390 S | | 4/2000 | Kontos | |
| 6,055,942 A | | 5/2000 | Romanak et al. | |
| 6,289,849 B1 | | 9/2001 | Macedo et al. | |

OTHER PUBLICATIONS

Jul. 31, 2003 Printout of web page at http://www.critter-beach.com/general/general2.html.

* cited by examiner

*Primary Examiner*—Alexander S. Thomas
(74) *Attorney, Agent, or Firm*—Joseph G. Swan

(57) ABSTRACT

An apparatus that removably connects an AA or AAA-size flashlight conjoined with a reflective device that can be removably attached to a retractable leash, or any other device, or the forearm of a person using a standard non-retractable leash. The apparatus has a loop section, and long and short members of primarily elastic material with Velcro™ hook and loop type fasteners positioned at either end. The loop section is a receiving area for a flashlight and is integrated within the long and short members. The long and short members and loop section have a reflective property. The long and short members wrap completely around the vertical mid-section of the retractable leash. The reflective quality of the device combined with use of a flashlight allows the person walking a dog to become more visible to others in the absence of ambient light, as well as, providing increased visibility by the individual person.

9 Claims, 2 Drawing Sheets

REFLECTIVE FLASHLIGHT HOLDER

Priority is claimed to U.S. Provisional Patent Application Ser. No. 60/413,744, titled "Reflective Flashlight Holder for Use on Pet Leashes" which was filed on Sep. 27, 2002, and is incorporated herein by reference as though set forth herein in full.

BACKGROUND OF THE INVENTION

1. Field of the Invention

The present invention concerns a reflective flashlight holder and is particularly directed to a flashlight holder that is made substantially of fabric material.

2. Description of the Related Art

A person walking a dog at night along city or rural streets is exposed to the increased hazards of cars and motorcycles, based primarily on the reduced ability of drivers to see such a pedestrian and dog from a reasonably safe distance. Similarly, other conditions, including inclement weather, often result in reduced visibility. Bicycle riders and other pedestrians also face such increased hazards.

A number of different techniques conventionally have been used to produce accessories that allow a flashlight to be removably attached to a retractable pet leash. These conventional accessories for a retractable leash typically only provide a single forward-facing light source, thereby significantly limiting their usefulness. In addition, such conventional accessories often are expensive to manufacture and fairly limited in how they may be used.

SUMMARY OF THE INVENTION

The present invention addresses these problems by providing an apparatus that both provides for removably attaching a flashlight as an active light source and also has a reflective surface, thereby significantly increasing visibility at night and in other inclement conditions.

Thus, in one aspect the invention is directed to a reflective flashlight holder, made from an elongated strip of elastic fabric material, having reflective material on its outer surface substantially along its entire length. In one representative embodiment, a strip of reflective material is laminated along the center of the strip of elastic fabric material. Attachment means (e.g., Velcro) on each end of the elongated strip may be attached to each other, and between its ends, the elongated strip is sewn so as to form a loop. Preferably, such loop is sized so as to accommodate a penlight flashlight. It is also preferred that the elongated strip of fabric material is sized to wrap around an entire vertical mid-section of an ordinary retractable leash.

Generally speaking, the present invention may be used for attachment of a flashlight to the housing of a conventional retractable leash. However, an apparatus according to the present invention may be used in a wide variety of other applications, as well. For ease of discussion, in many instances the disclosure herein refers to the preferred application in which the apparatus of the present invention attaches to such a conventional retractable leash.

The structure of the apparatus according to the preferred embodiments of the invention positions a flashlight in a forward facing direction, thereby allowing increased visibility by the pedestrian and increased awareness of the pedestrian by drivers of approaching vehicles. One element of the apparatus is a reflective device which may, for example, be positioned along the vertical mid-section of a retractable leash. In this embodiment, because the pedestrian naturally holds the retractable leash in a slightly downward position, the reflective device is visible by oncoming vehicles, vehicles approaching from behind the pedestrian, and vehicles approaching from either side, as when the pedestrian is walking a dog across a street. In any event, the reflective device according to the present invention often can increase the visibility of a pedestrian in reduced ambient light when approached by the headlights of vehicles.

Unique to the apparatus is the reflective device and flashlight holder. Devices only providing for a flashlight mount and no reflective properties along the mid-section of the retractable leash forces the pedestrian to gain attention of the drivers of the approaching vehicles by shining a flashlight at them, potentially leading to an accident through such an active distraction. The reflective device provides a more passive means for gaining the attention of approaching drivers, while the flashlight is reserved for the pedestrian's own increased visibility, or for signaling distant drivers.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 2:
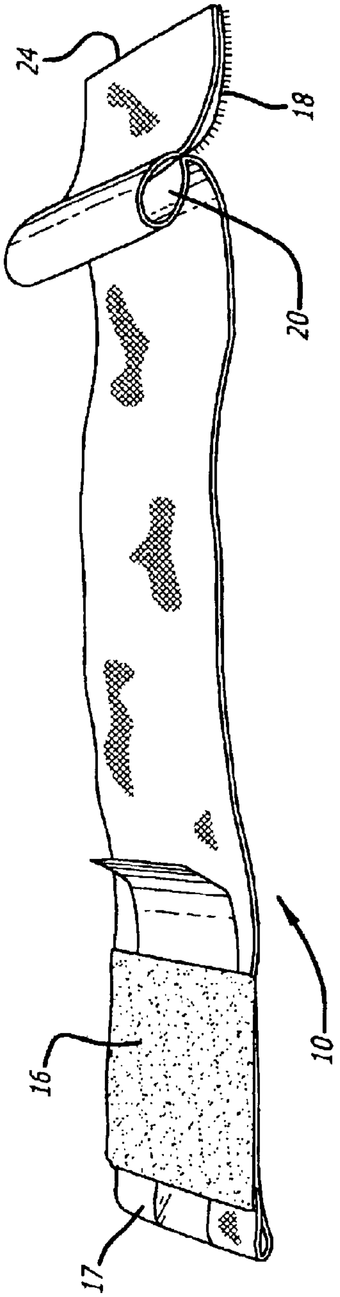
FIG. 2 is a bottom perspective view of the reflective flashlight holder shown in FIG. 1.
Figure 1:
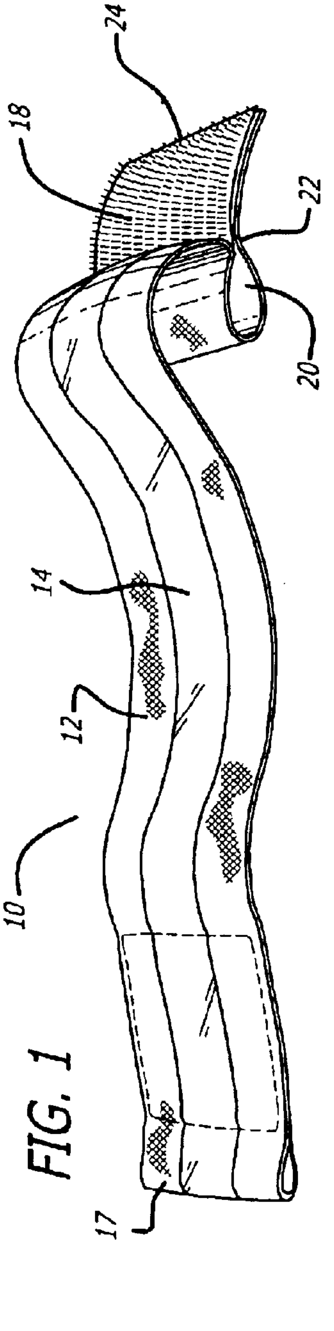
FIG. 1 is a top perspective view of a reflective flashlight holder according to the present invention.

A reflective flashlight holder 10 according to the present invention is illustrated in FIGS. 1 and 2. As shown, flashlight holder 10 is formed in substantial part from a single strip 12 of elastic material having reflective material 14 extending along the entire length of at least one of its sides. In the present embodiment, reflective material 14 is laminated as a strip along the center line of strip 12. It addition, strip 12 has a patch of Velcro™ 16 and 18 at each of its ends, and is sewn so as to form a loop 20 which may accommodate a flashlight. The flashlight holder 10 may be assembled from the following components:

- 14 inch (L)×2 inch (W) elastic strip 12 with a ¾ inch width of reflective material 14 laminated along the full length
- 2 inch (L)×2 inch (W) loop Velcro™ (hook and loop type fastener) 16
- 1½ inch (L)×2 inch (W) hook Velcro™ (hook and loop type fastener) 18
- ½ inch button of adhesive hook Velcro™ (hook and loop type fastener)

Starting with these components, flashlight holder 10 may be assembled in the following manner:

1. Lay out the 14 inch×2 inch length of elastic strip 12 with the reflective material 14 side facing downward.

2. Select an end and stitch the 2 inch×2 inch loop Velcro (hook and loop type fasteners) 16, leaving approximately a ⅛ inch tab of elastic 17 at what is now termed the long member.

3. Turn over the elastic strip 12 with the reflective material 14 side facing upward and select the opposite end at what is now termed the short member.

4. Stitch the 1½ inch hook Velcro (hook and loop type fastener) 18 onto the short member from the bottom of the side edge to the top edge, across the top edge and down the other side edge. Stop and cut the thread, leaving the bottom edge 22 of the Velcro (hook and loop type fastener) 18 unsewn.

5. Fold the short member with the reflective material 14 side on the inside of the fold at the 2½ inch mark.

6. Sandwich the hook Velcro (hook and loop type fastener) 18 between the folded elastic material 12 flush to the end edge of the short member.

7. Double-stitch at the 1⅛ inch mark across the folded elastic material 12 to include the hook Velcro (hook and loop type fastener) 18 unsewn edge 22. This finishes the short member and creates the loop 20 that receives the flashlight.

8. The final product 10 should have a long member of approximately 10 inches in length with the loop Velcro 16 and an end edge with a ⅛ inch tab 17 of elastic material 12, a short member of 1½ inches in length with the hook Velcro (hook and loop type fastener) 18 and a flush end edge 24, and a loop 20, having used 2 inches of the elastic material 12 to secure the hook Velcro (hook and loop type fastener) 18 by ⅛ inch for a finished loop using 1⅞ inches of the elastic material 12.

Figure 3:
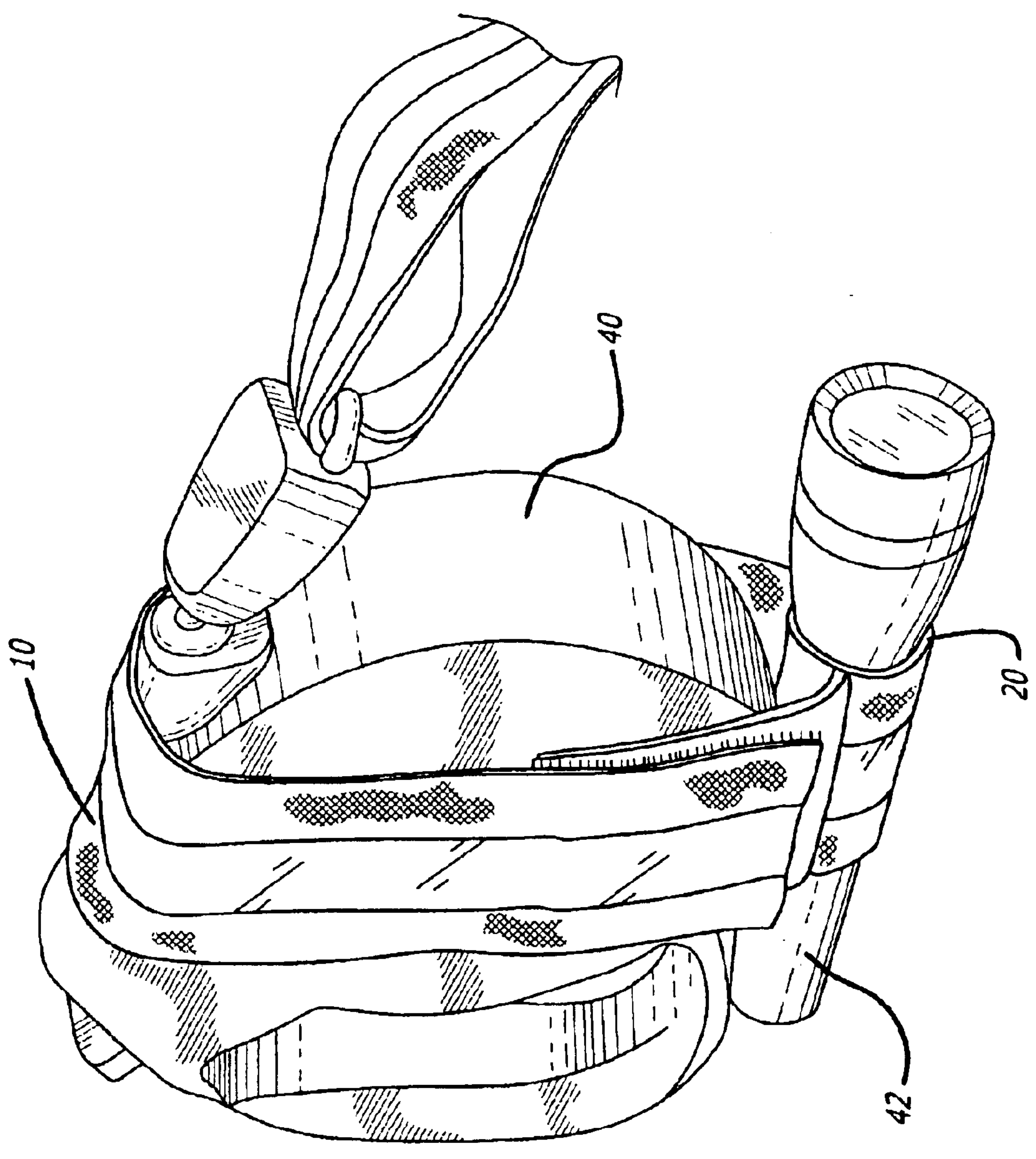
FIG. 3 is a front perspective view of a flashlight holder according to the present invention attached to the housing of a retractable leash.

The use of flashlight holder 10 according to a representative application of the present invention will now be described with reference to FIG. 3. In this application, flashlight holder 10 is attached to a retractable leash housing 40 by wrapping flashlight holder 10 around housing 40 with the reflective material 14 facing outwardly. Then, the Velcro strip 16 is pressed onto the Velcro strip 18 in order to secure flashlight holder 10 around housing 40.

Figure 4:
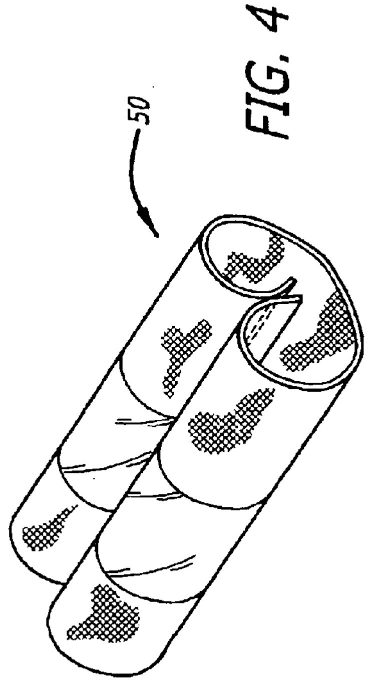
FIG. 4 is a perspective view of an adapter ring according to a preferred embodiment of the invention.

A complimentary flashlight 42 is placed within the loop 20 designed to receive it. If necessary, an adapter ring 50 (as shown in FIG. 4) may be used to ensure that the flashlight is adequately secured within loop 20. This may be desirable if loop 20 is sized to accommodate a flashlight 42 that uses AA batteries and the user wishes to insert a flashlight 42 that uses AAA batteries into loop 20. In this case, the adapter ring 50 is first inserted into loop 20 and then the flashlight 42 is placed within adapter ring 50.

Preferably, adapter ring 50 is a loop of elastic material and, more preferably, is the identical material from which elastic strip 12 is made. Accordingly, simply taking a short segment of such material and sewing its ends together may produce adapter ring 50. In any event, ring 50 preferably has the same width as elastic strip 12.

If adapter ring 50 is not being used to secure the flashlight 42 within loop 20, it may be used for other purposes. For example, adapter ring 50 may be slid over a leash itself of anything else that the user wants to make more visible.

Returning to FIG. 3, the flashlight 42 and loop 20 are positioned along the bottom length of the retractable leash with the reflective side of the device facing outwardly. The loop 20 and the short member are held in place while pulling the end of the elastic long member up, over, and around the vertical mid-section of the retractable leash. The long and short members are then secured by attaching the Velcro™ (hook and loop type fastener) patches 16 and 18 together. A complimentary ½ inch hook Velcro™ (hook and loop type fastener) button also may be positioned on the bottom of the retractable leash to prevent rotation of the apparatus.

It should be understood that flashlight holder 10 may instead be applied to a wide variety of other devices and articles, including bicycles, purses, a wearer's arm, and the like.

Although the present invention has been described in detail with regard to the exemplary embodiment thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A reflective flashlight holder, comprising (a) an elongated strip of elastic fabric material, having reflective material on its outer surface substantially along its entire length; and (b) attachment means on each end of the elongated strip for attaching to each other, wherein between its ends, the elongated strip is sewn so as to form a loop.

2. A reflective flashlight holder according to claim 1, wherein the loop in the elongated strip is sized so as to accommodate a penlight flashlight.

3. A reflective flashlight holder according to claim 1, wherein the attachment means comprises a hook-and-loop-type fastener.

4. A reflective flashlight holder according to claim 1, wherein the elongated strip is approximately 2 inches in width.

5. A reflective flashlight holder according to claim 1, wherein the reflective material is laminated onto the elongated strip.

6. A reflective flashlight holder according to claim 1, wherein the elongated strip is approximately 14 inches in length.

7. A reflective flashlight holder according to claim 1, further comprising a separate second loop sized similarly to the loop for adaptively inserting a smaller-sized flashlight into said loop.

8. A reflective flashlight holder according to claim 7, wherein the separate second loop also is comprised of elastic material having reflective material on its outer surface.

9. A reflective flashlight holder according to claim 1, wherein the elongated strip is sized to wrap around an entire vertical mid-section of an ordinary retractable leash.

* * * * *